Patented June 8, 1937

2,083,267

UNITED STATES PATENT OFFICE 2,083,267

CEMENT AND PROCESS OF MAKING THE SAME

Guy W. Jordan, Rockmart, Ga.

No Drawing. Application November 1, 1934, Serial No. 751,101

5 Claims. (Cl. 106—25)

This invention relates to a process for making an improved cement of the Portland cement type and to the product of said process, and more particularly to a process for making such a cement of the hydraulic type or of the masonry type, as may be desired.

As is well known, one objection to ordinary Portland cement is the fact that upon hydration the tri-calcium silicate of the cement sets free a certain amount of lime (CaO) which is extremely soluble in ordinary water or water containing certain salts with a detrimental effect to concrete. Furthermore, in certain masonry cements, containing Portland cement, the liberation of this calcium oxide causes efflorescence and staining, which is objectionable in masonry work.

Attempts have been made to overcome this objection by adding to the Portland cement certain ingredients such as trass, Puzzolano, slag, etc., or by mixing quicklime with a precalcined siliceous material, hydrating, and adding the resulting hydrate to the Portland cement.

It has been demonstrated that only with the purest of siliceous materials, containing approximately pure silica and occurring naturally in a finely sub-divided state, does there occur at the temperature of hydration, a real, efficient and complete combination of lime and siliceous material. Furthermore, such necessary siliceous materials are so limited in occurrence and quantity as to make their use, for the above purpose, infeasible in commercial operations.

The object of the present invention is to overcome the objections above indicated by the use of the raw materials heretofore used in the manufacture of Portland cement, materials whose occurrence is generally widespread and plentiful in quantity, and involving the use of the same mechanical equipment as that heretofore employed. With this object in view, the invention consists in the process hereinafter set forth and in the product resulting from the practice of such process.

The process consists essentially of three steps:

(1) There is formed a correct mixture of argillaceous, and/or siliceous and calcareous materials ordinarily used in the manufacture of Portland cement, said materials being so proportioned that upon fusion the resulting clinker will contain from 30% to 75% of tri-calcium silicate and approximately no free lime, and this mixture is then calcined to an incipient fusion at a temperature preferably from 1350° C. to 1650° C. This product is then analyzed to determine the percentage of tri-calcium silicate therein.

(2) There is then prepared another mixture of argillaceous, and/or siliceous and calcareous materials which are intimately mixed and calcined at a temperature preferably ranging from 700° C. to 1200° C. to a complete combination of the calcareous with the siliceous material. The raw materials in this second mixture are so proportioned that the resulting calcined product contains chemically active uncombined silica to combine with or neutralize the lime that will be set free when the tri-calcium silicate of the first calcination is hydrated. This amount of chemically active silica will, of course, vary with the amount of tri-calcium silicate contained in the first clinker, as well as with the kind of siliceous material used and the type of finished cement desired. This variation may vary from as low as 3% to as high as 80%. By this second procedure, the following compounds will be formed:

Chemically active silica ($SiO_2$)
Calcium-alumino di-silicate ($CaO\ Al_2O_3\ 2SiO_2$)
Calcium-ferro di-silicate ($CaO\ FeO\ 2SiO_2$)
Mono-calcium-silicate ($CaO\ SiO_2$)
Small amounts of magnesium and ferric compounds.

(3) These two calcined products, after a proper interval of cooling and seasoning, are then mixed in such proportions that there will be a correct amount of chemically active silica to combine with all of the lime liberated from the tri-calcium silicate of the first calcination upon hydration of the cement. This combined material, with the proper amount of calcined or uncalcined gypsum to regulate the set, is then intimately ground to a fine powder in a cement mill of the proper type so that 90% or more will pass a 200 mesh sieve.

Of the compounds indicated above as formed as the result of the second step, the chemically active silica will combine during hydration with the lime liberated by the tri-calcium silica of the Portland cement product of the first calcination. This compound will be practically insoluble in ordinary water or water containing sulfate salts. The other of said compounds will also hydrate when mixed with water in the form of concrete and will likewise be insoluble in ordinary water or in water containing sulfate salts. Over a period of several months all of these compounds collectively will acquire strengths equal to those of Portland cement, but with heats of hydration amounting to only a small fraction of those of ordinary Portland cement.

By regulating the proportions of raw materials used in steps 1 and 2, it is possible to manufacture cement of various types ranging from the Portland cement type with very high early strengths to that of masonry cement with adequate strength and superior qualities of plasticity and workability. As an example, the clinker calcined according to the procedure set forth in the first step above indicated and having a tri-calcium silicate content of 55% may be combined with a calcined material obtained by the procedure indicated in step 2 having chemically active silica amounting to 3%. When these two materials are mixed together in the proportions of one of the former and five of the latter, there is obtained an excellent masonry cement having strengths in excess of 150 pounds per square inch at 7 days and 250 pounds per square inch at 28 days, and all of this in addition to the qualities of being non-efflorescent, non-staining and insoluble in water.

As another example, a clinker manufactured according to the first step indicated above with a tri-calcium silicate content of 60% is mixed with calcined material obtained by the procedure of step 2, and containing approximately 16% chemically active silica, the two materials being mixed in equal proportions and intimately ground with the proper amount of gypsum added. This produces a cement having strengths equal to or greater than those stipulated in the standard specifications for Portland cement, with the added qualities of being practically insoluble in ordinary water or water containing sulfate salts and having a much lower heat of hydration than ordinary Portland cement. This makes it particularly suitable for use in bridges, dams, etc.

As indicated above, the proportions of the clinker containing the tri-calcium silicate on the one hand and the clinker containing the chemically active silica on the other hand may be and preferably are such that there will be in the combination the amount of chemically active silica necessary to combine with the lime set free from the tri-calcium silicate upon hydration. In some cases, however, the proportion of the material containing the chemically free silica may be more or less increased so that there will be more chemically free silica in the final combination than is required to combine with the lime set free from the tri-calcium silicate upon hydration. Furthermore, it will be readily appreciated by those skilled in the art that while the proportions given above are those that will produce ideal results, some variance may be made in such proportions with some sacrifice of the ideal results otherwise to be obtained. Furthermore, while the temperatures for calcining the mixtures indicated in steps 1 and 2 are those preferred, it is expressly understood that the invention is not limited to these exact temperatures. Various other modifications may be resorted to without departing from the spirit of the invention, the limits of which invention are defined in the appended claims.

Having thus described the invention, what is claimed is:

1. The method of making a cement, which consists in making a Portland cement clinker with approximately no free lime and having a large percentage of tri-calcium silicate, making a second clinker having chemically active silica, calcium-alumino di-silicate, calcium-ferro di-silicate and mono-calcium silicate, mixing the two clinkers in proportions to provide in the mixture an amount of chemically active silica sufficient to neutralize the lime set free on hydration of the tri-calcium silicate, and then grinding the mixture.

2. As a new product, a cement comprising Portland cement clinker having a large percentage of tri-calcium silicate and little or no free lime and mixed with a clinker having calcium alumino-di-silicate and mono-calcium-silicate together with sufficient chemically active silica to neutralize the lime set free upon hydration of the tri-calcium silicate.

3. As a new product, a cement with approximately no free lime and comprising tri-calcium silicate, chemically active silica, calcium-alumino di-silicate, calcium-ferro di-silicate, and mono-calcium-silicate, the chemically active silica being in proportion sufficient to neutralize the lime set free upon hydration of the tri-calcium silicate.

4. The method of making a cement which consists in making a Portland cement clinker with approximately no free lime and having a large percentage of tri-calcium silicate, making a second clinker having chemically active silica, calcium alumino-di-silicate and mono-calcium-silicate and mixing the two clinkers in proportions to provide in the mixture an amount of chemically active silica sufficient to neutralize the lime set free on hydration of the tri-calcium silicate.

5. The process of making a cement which consists in mixing argillaceous and/or siliceous material with calcareous material in such proportions that upon incipient fusion the resulting clinker will have a considerable percentage of tri-calcium silicate and approximately no free lime, then calcining the mixture to incipient fusion, then forming a second mixture of argillaceous and/or siliceous material with calcareous material in such proportions that when calcined to a complete combination of the calcareous material with the argillaceous and/or siliceous material the clinker will contain sufficient chemically active silica to neutralize the lime that will be set free when the tri-calcium silicate of the first clinker is hydrated, then calcining the second mixture, and then mixing the two clinkers.

GUY W. JORDAN.